US009755443B2

(12) United States Patent
Fink

(10) Patent No.: US 9,755,443 B2
(45) Date of Patent: Sep. 5, 2017

(54) SAFETY CONCEPT FOR BATTERIES

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 63 days.

(21) Appl. No.: 14/408,001

(22) PCT Filed: Apr. 22, 2013

(86) PCT No.: PCT/EP2013/058255
§ 371 (c)(1),
(2) Date: Dec. 15, 2014

(87) PCT Pub. No.: WO2013/189626
PCT Pub. Date: Dec. 27, 2013

(65) Prior Publication Data
US 2015/0180250 A1    Jun. 25, 2015

(30) Foreign Application Priority Data

Jun. 22, 2012 (DE) .................. 10 2012 210 603

(51) Int. Cl.
*H02J 7/00* (2006.01)
*H01M 10/44* (2006.01)
(Continued)

(52) U.S. Cl.
CPC .......... *H02J 7/0036* (2013.01); *B60L 3/0046* (2013.01); *B60L 3/04* (2013.01); *B60L 11/1803* (2013.01);
(Continued)

(58) Field of Classification Search
CPC ..................................................... Y02E 60/12
(Continued)

(56) References Cited

U.S. PATENT DOCUMENTS 6,025,696 A * 2/2000 Lenhart .................... H02H 7/18
320/122
2009/0267566 A1* 10/2009 Yano .................... B60L 11/1861
320/118
(Continued)

FOREIGN PATENT DOCUMENTS

DE    10 2010 027 850 A1    10/2011
DE    10 2010 027 864 A1    12/2011
(Continued)

OTHER PUBLICATIONS

International Search Report corresponding to PCT Application No. PCT/EP2013/058255, mailed Sep. 9, 2013 (German and English language document) (7 pages).

*Primary Examiner* — Suresh Memula
(74) *Attorney, Agent, or Firm* — Maginot, Moore & Beck LLP

(57) ABSTRACT

A safety device for a battery having battery cells that are configured to connect to poles of the battery via charging and isolating devices includes a discharge device. The discharge device is configured to connect in parallel to the battery cells. The discharge circuit can include at least one discharge resistor and an electronic valve. The electronic valve is configured to switch on and off. The discharge circuit can be configured to activate with a battery management system.

10 Claims, 3 Drawing Sheets

(51) Int. Cl.
  *B60L 3/00* (2006.01)
  *B60L 3/04* (2006.01)
  *B60L 11/18* (2006.01)
  *B60L 15/00* (2006.01)
(52) U.S. Cl.
  CPC ......... *B60L 11/1864* (2013.01); *B60L 15/007* (2013.01); *H01M 10/441* (2013.01); *H02J 7/0014* (2013.01); *H02J 7/0029* (2013.01); *H02J 7/0065* (2013.01); *B60L 2270/20* (2013.01); *H01M 2200/00* (2013.01); *H01M 2200/20* (2013.01); *Y02T 10/645* (2013.01); *Y02T 10/7005* (2013.01); *Y02T 10/7055* (2013.01); *Y02T 10/7061* (2013.01)
(58) Field of Classification Search
  USPC ........................................................ 320/135
  See application file for complete search history.

(56) References Cited

U.S. PATENT DOCUMENTS

| | | | |
|---|---|---|---|
| 2011/0074354 A1 | 3/2011 | Yano | |
| 2011/0148426 A1* | 6/2011 | Yokotani | G01R 19/16542 324/434 |
| 2011/0313613 A1 | 12/2011 | Kawahara et al. | |
| 2012/0292987 A1* | 11/2012 | Rutkowski | B60R 25/00 307/9.1 |
| 2012/0293112 A1* | 11/2012 | Suzuki | H01M 10/482 320/107 |
| 2012/0319658 A1* | 12/2012 | White | H02J 7/0016 320/134 |
| 2014/0225622 A1* | 8/2014 | Kudo | B60L 3/0046 324/433 |
| 2016/0152156 A1* | 6/2016 | Pritelli | B60L 3/0046 320/136 |

FOREIGN PATENT DOCUMENTS

| | | |
|---|---|---|
| EP | 2 221 940 A1 | 8/2010 |
| JP | 2003-142162 A | 5/2003 |
| JP | 2008-228518 A | 9/2008 |
| WO | 2011/128135 A1 | 10/2011 |
| WO | 2011/128136 A1 | 10/2011 |

* cited by examiner

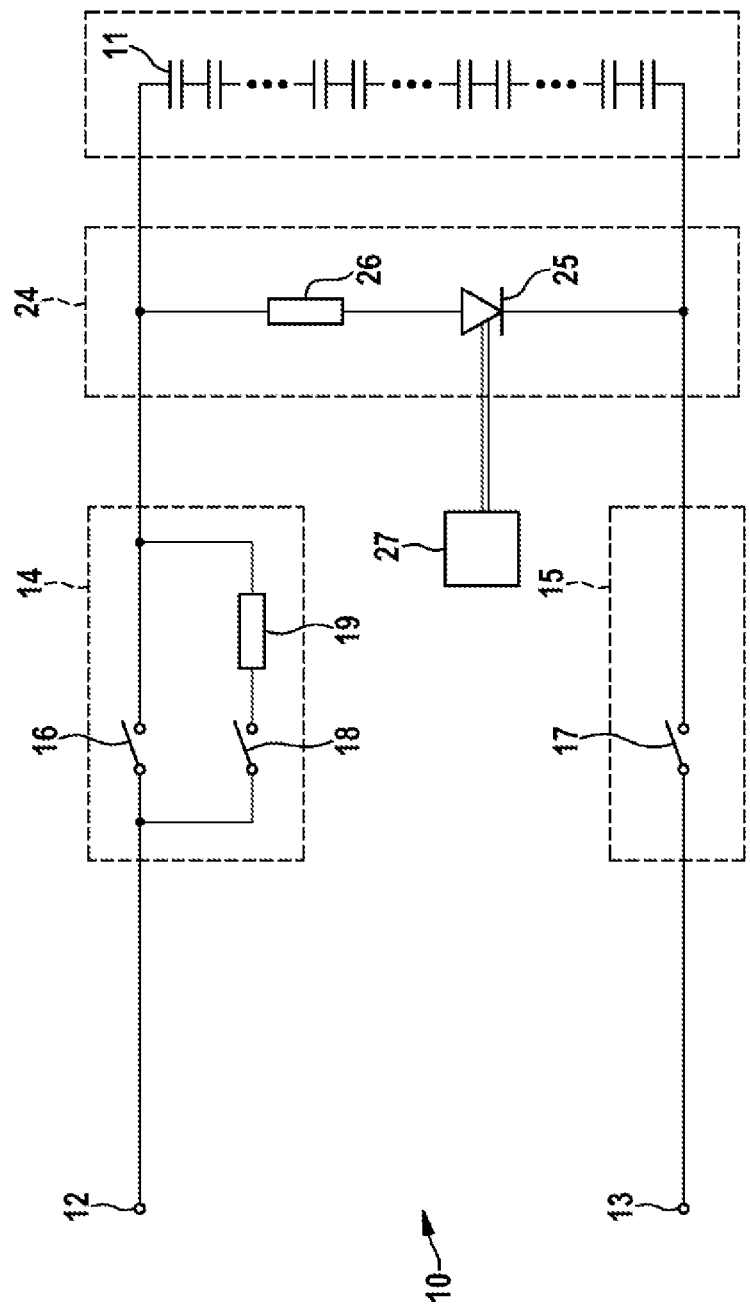

SAFETY CONCEPT FOR BATTERIES

This application is a 35 U.S.C. §371 National Stage Application of PCT/EP2013/058255, filed on Apr. 22, 2013, which claims the benefit of priority to Serial No. DE 10 2012 210 603.0, filed on Jun. 22, 2012 in Germany, the disclosures of which are incorporated herein by reference in their entirety.

The present disclosure relates to a safety concept having a corresponding device and an associated method for batteries, in particular for traction batteries in hybrid vehicles or electric vehicles.

BACKGROUND AND SUMMARY

Batteries which are provided for use in hybrid vehicles or electric vehicles are referred to as traction batteries since they are used for feeding electrical drives. In order to obtain the power data and energy data which are required in hybrid vehicles or electric vehicles, individual battery cells are connected in series and partially additionally in parallel. In the case of electric vehicles, for example 100 cells or more are connected in series, with the result that the total voltage of the battery can be up to 340 V. Batteries which are used in hybrid vehicles also usually exceed the voltage limit of 60 V which is categorized as unproblematic in the case of touching by humans.

FIG. 1 illustrates the basic circuit diagram of a battery system according to the prior art. Such a battery system is described, for example, in DE-A 10 2010 027 850 with a detailed block circuit diagram.

In particular, FIG. 1 shows a battery 10 with assigned integrated electronics. A multiplicity of battery cells 11 are connected in series in order to obtain a high output voltage which is desired for a respective application. Optionally, the battery cells can also be connected in parallel in order to obtain a high battery capacity.

A charging and isolating device 14 is connected between the positive pole of the series circuit of the battery cells 11 and a positive battery terminal 12. In addition, an isolating device 15 is located between the negative pole of the series circuit of the battery cells 11 and a negative battery terminal 13. The charging and isolating device 14 and the isolating device 15 each comprises a contactor 16 and 17 as isolator switches. These contactors are provided for disconnecting the battery cells 11 from the battery terminals 12, 13, in order thereby to connect the battery terminals 12, 13 in a voltage-free fashion when required. Other switching means which are suitable for this application can also be used instead of contactors.

In addition, a charging contactor 18 is present in the charging and isolating device 14. A charging resistor 19 is connected in series with the charging contactor 18. The charging resistor 19 limits a charging current for the buffer capacitor which is connected into the DC voltage intermediate circuit of a customary battery-fed drive system when the battery is connected to the DC voltage intermediate circuit. When predefinable events occur, the battery can be activated or deactivated at one pole or two poles with the arrangement of the charging and isolating device (illustrated in FIG. 1) in the positive line and the isolating device in the negative line. For this purpose a control device which is not illustrated provides corresponding signals which activate the contactors.

By using the charging resistor 19, balancing currents can also be limited during the activation of the battery. In the case of an activation process, the charge switch 18 is firstly closed here in the charging and isolating device 14, with the isolator switch 16 opened, and additionally, if desired, the isolator switch 17 in the isolating device at the negative pole of the battery system is closed. The input capacities of externally connected systems are then charged by means of the charging resistor 19. If the voltage between the positive pole and the negative pole of the battery system differs only insignificantly from the total voltage of the battery cells, the charging process is terminated by closing the isolator switch in the charging and isolating device 14. The battery system is then connected with low impedance to the external systems and can be operated with its specified power data. Overall, the balancing currents which occur between the external systems and the battery system when the battery system is activated, can be limited to permissible values.

FIG. 2 illustrates an electric drive system, known, for example, from DE-A 10 2010 027 864.5, for an electric vehicle or hybrid vehicle as a basic circuit diagram. Here, a battery 20 is connected to a DC voltage intermediate circuit which is buffered by a capacitor 21. A pulse-controlled inverter 22, which makes available sinusoidal voltages, which are phase-offset with respect to one another at three outputs via, in each case, two switchable semiconductor valves 22a, 22b and two diodes 22c and 22d, for operating an electric drive motor 23, for example a three phase machine, is connected to the DC voltage intermediate circuit. The capacity of the capacitor 21 has to be large enough to stabilize the voltage in the DC voltage intermediate circuit for a period of time in which one of the switchable semiconductor valves is activated.

The electric drive system which is known from DE-A 10 2010 027 864.5 comprises a battery 20 which has, similarly to the battery 10 illustrated in FIG. 1, a multiplicity of battery cells which are connected in series. A charging and isolating device is present in the positive line and an isolating device is present in the negative line, between this series circuit comprising battery cells and the positive and negative terminals of the battery 20. By means of these isolating devices it is possible, as in the case of the battery 10 from FIG. 1, to disconnect the positive pole of the battery and/or the negative pole of the battery from the battery cells in the case of an accident or in the event of a malfunction when a connectable of the charger device is not operating satisfactorily, and thereby switch to a voltageless state. In particular, two-pole disconnection of the battery from the traction on-board power system is proposed in order to place the battery in a safe state. The electric charge which is stored in the battery cells is still retained in this case.

BRIEF DESCRIPTION OF THE DRAWINGS

FIG. 3 is an exemplary embodiment of a safety device.

DETAILED DESCRIPTION

Figure 1:
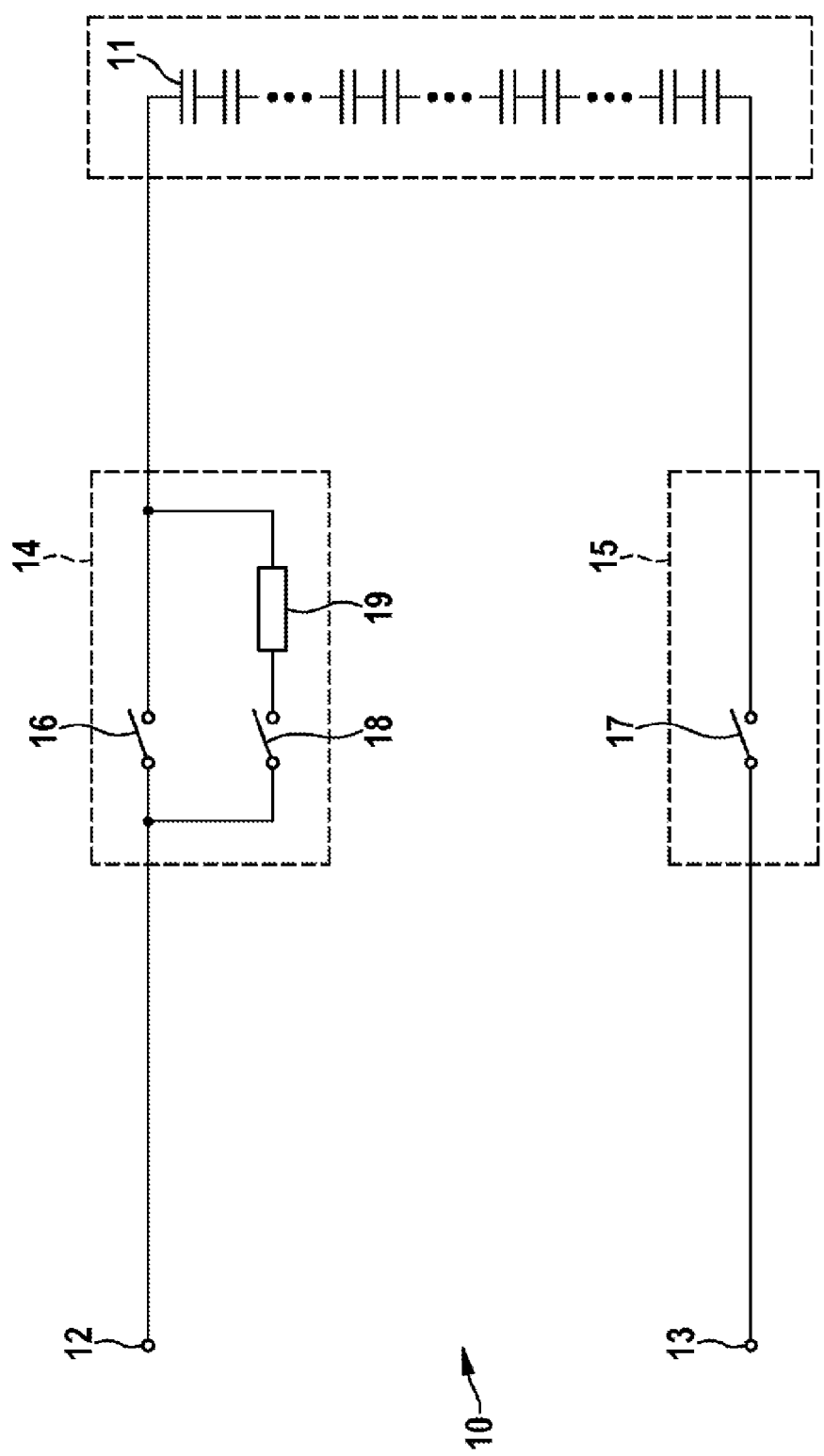
FIG. 1 is a basic circuit diagram of a battery system.

A possible reaction can originate from the still-charged battery cells even after they are disconnected, if a short-circuit is triggered by certain effects. This can still occur even after a relatively long time. The advantage of the disclosure is that in a safety concept for batteries, in particular for traction batteries, the battery or the individual battery cells is/are placed in a non-critical state in which external effects or influences cannot lead to dangerous situations.

This advantage is achieved by placing the battery cells in a safe state after their disconnection from external connections, in particular after the disconnection from the traction on-board power system of a vehicle by discharging via discharging means so that the advantages of the disclosure are achieved, the additional discharge circuit, specified in FIG. 3, is added to a system, in particular a battery according to the prior art. This additional discharge circuit is actuated in a particularly advantageous way using a battery management system which outputs corresponding actuation signals. The battery management system advantageously comprises here at least one processor as well as the associated hardware and provides the required actuation signals and the switching means or contactors for the activation thereof.

It is particularly advantageous that the inventive discharging of the battery cells is initiated immediately after a disconnection, in particular a two-pole disconnection, of the battery cells. For this purpose, what is referred to as a clocking device, which in a further advantageous solution is implemented as a semiconductor switch or electromagnetic switch with an associated regeneration resistor is activated in an advantageous manner. In the regeneration resistor, the electrical energy which is extracted from the battery cells and which is to be destroyed is converted into thermal energy here. The inventive discharging of the battery cells advantageously functions even if other components of a traction drive which are supplied by a battery according to the disclosure, such as, for example, the inverter which generates an alternating voltage required for supplying a motor from the battery voltage, are no longer functionally capable.

In one development of the disclosure, additional measures can be provided which, for example, also include the inverter. In this context, parallel charging of the battery can advantageously take place via a battery-internal clocking device with discharging via the charging resistor and the charging switches as well as the power switches of the inverter. These power switches are advantageously the semiconductor valves as well as the diodes of the inverter.

A further advantage is provided by the possibility of carrying out additional discharging of the battery and of the battery cells by means of additional electronics for equalizing the state of charge of the battery cells. In such an arrangement, which carries out what is referred to as cell balancing, the ohmic resistors then present can advantageously be used to discharge the cells, or can additionally also be included in the discharging.

FIG. 3 illustrates an exemplary embodiment of the disclosure. The components as specified in FIG. 3 correspond to the components described in more detail in FIGS. 1 and 2 and have the same reference symbols. In addition, a discharge circuit 24 is connected parallel to the series circuit of the battery cells 11. In the exemplary embodiment, the discharge circuit 24 is arranged inside the battery 10, but it could also be arranged outside the battery 10. The discharge circuit, which functions, for example, as a clocking device, comprises an electronic valve 25 which can be switched on and off as well as a resistor 26 which is connected in series with this valve 25. The electronic valve 24 can be activated, for example, by a battery management system 27 (not illustrated in more detail). The battery management system 27 initiates here a discharge of the battery cells 11 immediately after the disconnection, in particular the two-pole disconnection. For this purpose, the battery management system transmits actuation signals to the discharge circuit as soon as it detects the disconnection of the battery cells.

For this purpose, the electronic valve 25 is actuated in accordance with the discharge circuit 24, with the result that it functions as what is referred to as clocking device. In the simplest case, the electronic valve 25 is a semiconductor switch or an electromechanical switch. The regeneration resistor 26 in which the electrical energy which is to be extracted from the battery cells is converted into thermal energy completes the discharge circuit 24.

The regeneration resistor 26 and the electrical or electromechanical valve 25 which can be switched on and off are configured here in such a way that the battery cells 11 can be discharged completely from the fully charged state in a predefined time. If, for example, the battery of an electric vehicle is to be discharged with an energy content of 24 kW/h within 24 hours, the clocking device must be configured for a continuous output of 1 kW.

Figure 2:
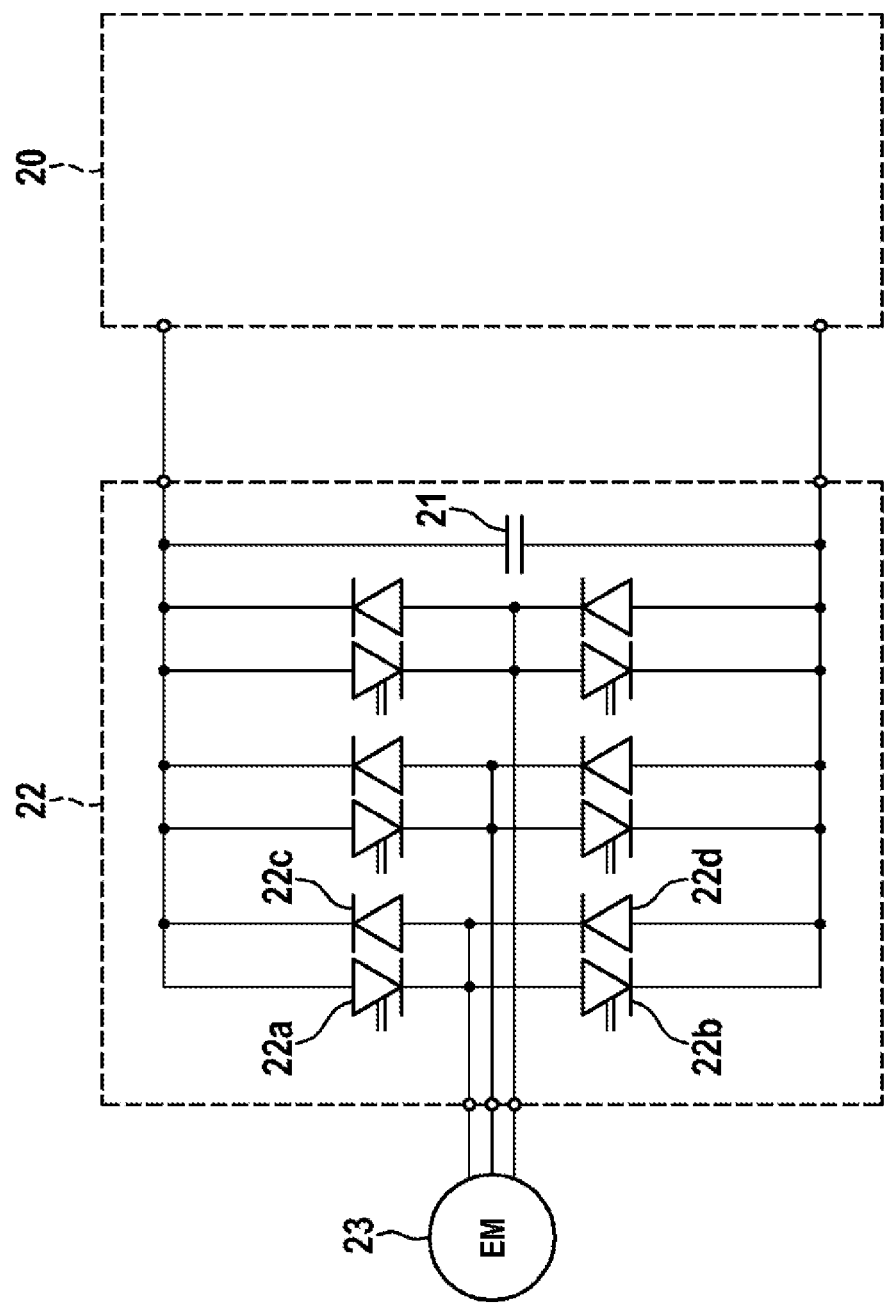
FIG. 2 is an electric drive system for an electric vehicle or hybrid vehicle as a basic circuit diagram.

The concept illustrated in FIG. 3 functions even if other components of the traction drive, such as, for example, the inverter are no longer functionally capable. Such a traction drive is illustrated in FIG. 2, wherein the inverter is configured, for example, as a pulse-controlled converter. According to the disclosure it can also be included in the discharge concept for the battery cells.

In a development of the concept illustrated in FIG. 3, measures can be additionally provided which, for example, also include the inverter. In this context, a parallel discharge of the battery cells 11 can occur via the battery-internal clocking device 24 with a discharge via the charging resistor 26 and the charging switch 25 as well as the power switch of the inverter 22.

As a further possibility, additional discharging of the battery and of the battery cells 11 can occur via electronics, then necessary, for equalizing the state of charge of the battery cells 11. In such an arrangement, which carries out what is referred to as cell balancing, the ohmic resistors, which are then present, can be used to discharge the cells or can additionally also be included in the discharging. The actuation of an electronic valve, which can be switched on and off, of the discharge circuit 24 by the battery management system 27 is carried out after the single-pole or two-pole decoupling of the battery cells 11 if the battery management system 27 detects such a request on the basis of certain predefinable criteria.

The invention claimed is:

1. A safety device for a battery, comprising:
   a discharge circuit configured to connect parallel to battery cells when a disconnection of battery cells from at least one pole of two poles of the battery is detected, wherein the battery includes the battery cells configured to connect to poles of the battery via charging and isolating devices.

2. The safety device as claimed in claim 1, wherein the battery is a traction battery.

3. The safety device as claimed in claim 1, wherein the discharge circuit includes at least one discharge resistor and an electronic valve, wherein the electronic valve is configured to switch on and off.

4. The safety device as claimed in claim 3, wherein the electronic valve comprises a semiconductor switch or an electromechanical switch.

5. The safety device as claimed in claim 1, wherein the discharge circuit is configured to activate with a battery management system.

6. The safety device as claimed in claim 1, further comprising:
   an inverter configured to connect to the poles of the battery, the inverter is connected to a battery management system and is configured to actuate using the battery management system to discharge the battery.

7. The safety device as claimed in claim 1, further comprising:
electronics configured to equalize state of charge of the battery cells,
wherein the electronics include balancing resistors and are connected to a battery management system, the electronics are configured to actuate using the battery management system and the balancing resistors are configured to discharge the battery cells.

8. A method for discharging a battery, comprising:
detecting a disconnection of battery cells from at least one pole of two poles of the battery using a battery management system; and
connecting a discharge circuit of a safety device parallel to the battery cells using a battery management system if the disconnection is detected,
wherein the battery includes the battery cells configured to connect to the two poles of the battery via charging and isolating devices.

9. The method as claimed in claim 8, further comprising:
sending actuation signals, using the battery management system, to the discharge circuit to connect the discharge circuit parallel to the battery cells.

10. The method as claimed in claim 8, further comprising:
discharging the battery cells after the disconnection of the battery cells from the two battery poles.

\* \* \* \* \*